United States Patent Office

3,260,415
Patented July 12, 1966

3,260,415
PARTICULATE SOLID MATERIAL DISCHARGE
APPARATUS
Kozo Minamiyama, Minoo-shi, Nobutaka Ninomiya and Hirohiko Ichikawa, Kyoto-shi, and Zenzi Matsumoto, Izumiotsu-shi, Japan, assignors to Takeda Chemical Industries, Limited, Osaka-shi, Japan
Filed July 13, 1964, Ser. No. 382,019
2 Claims. (Cl. 222—162)

This invention relates to apparatus for discharging particulate solid material from a container.

More particularly, the invention pertains to a particulate solid material discharge apparatus, mainly comprising a pair of slit plates which are coaxially and rotatably associated with a drive shaft, and a segmented cylindrical member which is housed stationarily inbetween said plates in such a manner that, when energized, the particulate solid material is discharged in a uniform descent through the alternate slit of the plates via each of the segmented chambers one after another. The apparatus of this invention is particularly useful for decolorizing, purifying or drying liquids or gases with particulate solid material. It is also useful for the carrying out of chemical reactions between particulate solid material and gases.

One of the methods of carrying out the adsorption of liquids or gases with particulate solids or the reaction between particulate solids and gases is accomplished by passing the liquid or gas to be treated through a bed of solid material. In this case, additional bed material must be added to the top of the adsorption or reaction chamber and the spent bed material must be removed from the bottom of said chamber, if the process is to be continuous. For this purpose, there is employed in the prior art a rotary valve which is so disposed as to effect the continuous downward shift of the spent solid material through the discharge mouth.

According to the above method, however, the central portion of the bed material has a tendency to descend faster than the peripheral portion, and in some cases, the peripheral portion hangs in place adjacent the wall of the chamber. Such non-uniform descent not only reduces the capacity of the adsorber or reactor but also permits portion of the liquid or gas being treated to pass upward through the bed without being treated with the solid material.

The major object of the present invention is to provide an apparatus for discharging particulate solid material in a uniform descent.

Another object of the invention is to provide an apparatus for discharging particulate solid material in a quantitative amount.

A further object of the invention is to provide an apparatus for discharging particulate solid material having means for controlling in a precise manner the stay period of particulate solid material in the container, whereby treatment of the particulate solid material or adsorption or reaction of the liquid or gas under treatment can be carried out quite quantitatively.

Other objects and specific features of the present invention will become apparent in view of the following description and the accompanying drawings, in which.

Figure 1:
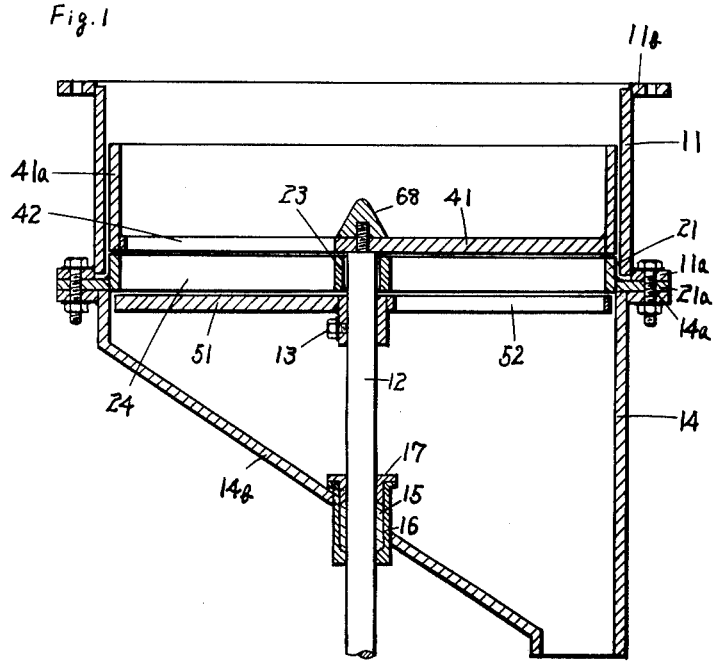
FIGURE 1 is a vertical sectional view of a particulate solid material discharge apparatus of this invention.
Figure 2:
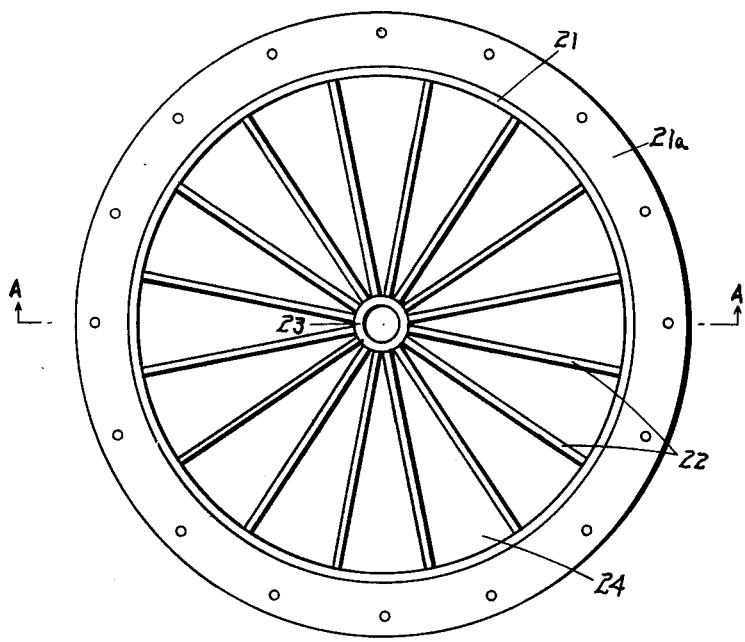
FIGURE 2 is a plan view of a segmented cylindrical member employed in the embodiment shown in FIGURE 1.
Figure 3:
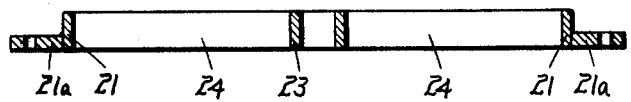
FIGURE 3 is a sectional view along the line A—A of FIGURE 2.
Figure 4:
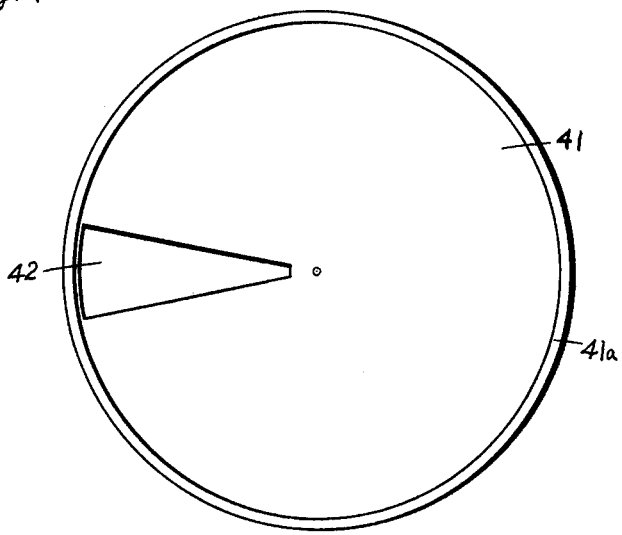
FIGURE 4 is a plan view of the upper plate which is employed in conjunction with the cylindrical member of FIGURE 2.
Figure 5:
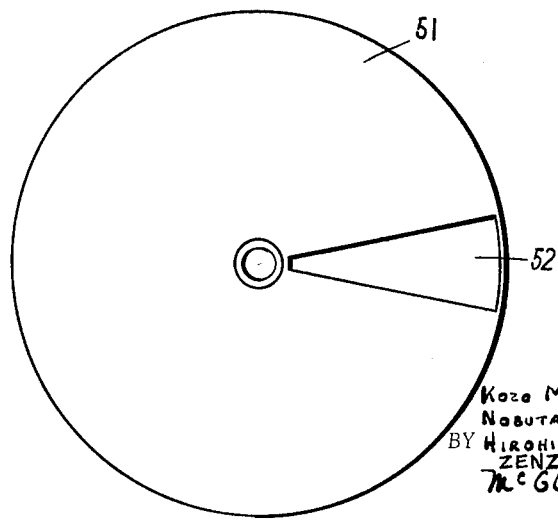
FIGURE 5 is a plan view of the lower plate which is employed in conjunction with the cylindrical member of FIGURE 2.

Referring now to the drawings wherein like reference characters are employed throughout to designate like members and wherein the second order digit is employed to indicate the serial number of the drawings where members in question are shown in more detail, there is disclosed a preferred embodiment of the principles of the present invention, mainly comprising coaxial plates 41 and 51 which are rotatably and transversely housed in a cylindrical casing 11, and a segmented cylindrical member 21 which is disposed stationarily inbetween and coaxially with said plates 41 and 51.

In more detail, the upper plate 41 is provided with a radially disposed slit or aperture 42 for passing therethrough the solid material descending from the solid material container, such as an adsorber 61. Said plate 41 is further provided with an upturned peripheral flange 41a for moveably engaging therewith the bottom portion of the solid material container, and is secured, on the other hand, by means of soldering or other suitable means to the top end portion of the drive shaft 12 which is operationally associated with the energizing source.

The lower plate 51 is also provided with a radially disposed slit or aperture 52 which is substantially of the same size and shape with the aperture 42. Said plate 51 is detachably secured to the drive shaft 12 by means of a bolt 13 in predetermined spaced relation to and coaxially with said plate 41. Said plates 41 and 51, moreover, are so disposed as to have each of the slits 42 and 52 occupying opposite direction in the instant embodiment.

The cylindrical segmented member 21, on the other hand, is provided with a plurality of sections 22 radially extending from the hub 23, whereby there are formed a plurality of segmented chambers 24, each of which chambers is substantially of the same size and shape with the slits 42 and 52 in the instant embodiment. Said member 21 is further secured stationarily to the casing 11 by means of the outturned flange 21a in association with the outturned flange 11a and inbetween the plates 41 and 51 by means of the hub 23 moveably passing therethrough the shaft 12. Thus the slit plates 41 and 51 are allowed to rotate at a predetermined constant velocity and independently of the cylindrical member 21 when the drive shaft 12 is motivated by means of the energizing source. Member 14 is a chute which is secured to the casing 11 by bolting or other suitable means the outturned flange 14a with the outturned flange 11a via outturned flange 21a, operationally passing the drive shaft 12 through the slanting bottom wall 14b. To secure the drive shaft 12 in operating position, a gasket 15 is inserted into the ground 16 by means of a screw member 17.

Figure 6:
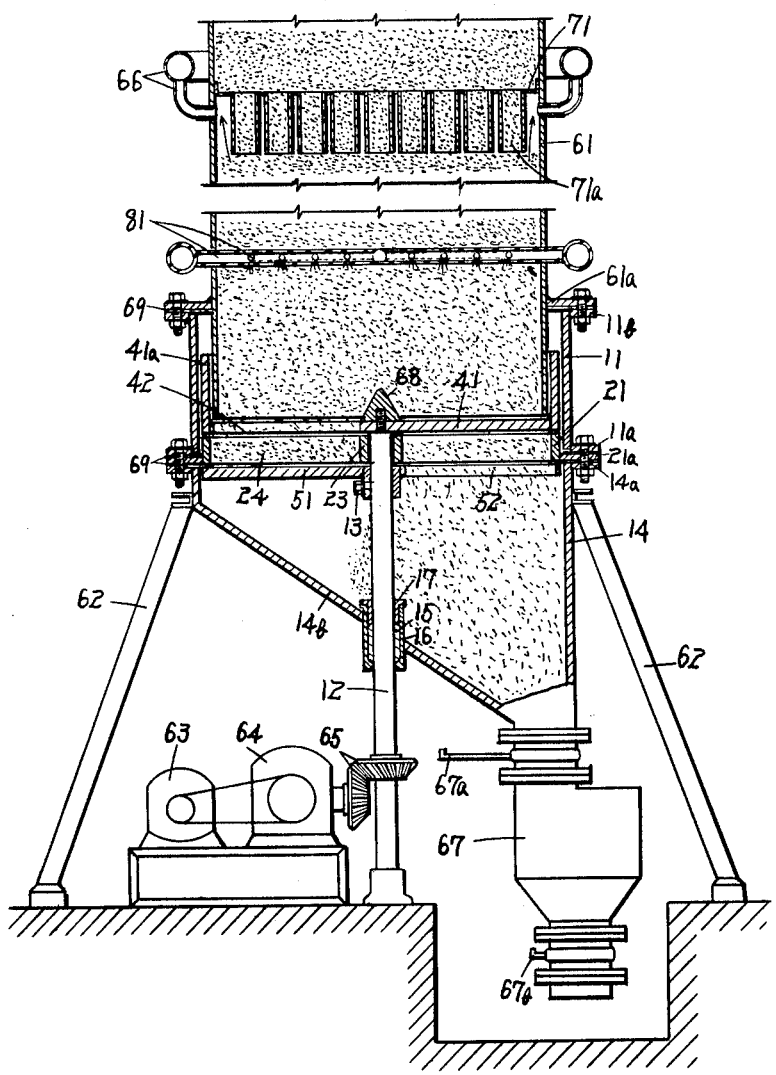
FIGURE 6 is a vertical sectional elevation showing a preferred mode of operation of the apparatus of FIGURE 1 in conjunction with an adsorber.
Figure 7:
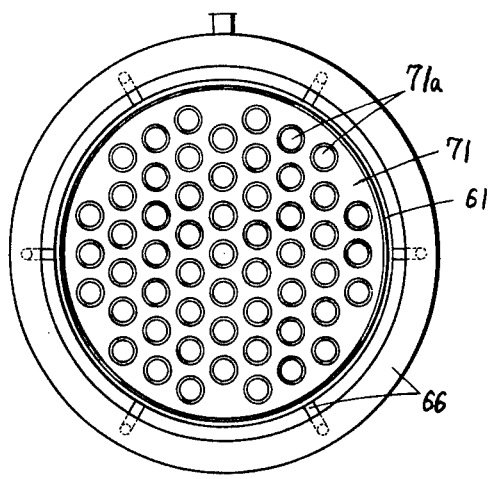
FIGURE 7 is a plan view of the particulate material transfer tray and outlet pipe of the treated liquid employed in the embodiment of FIGURE 6.
Figure 8:
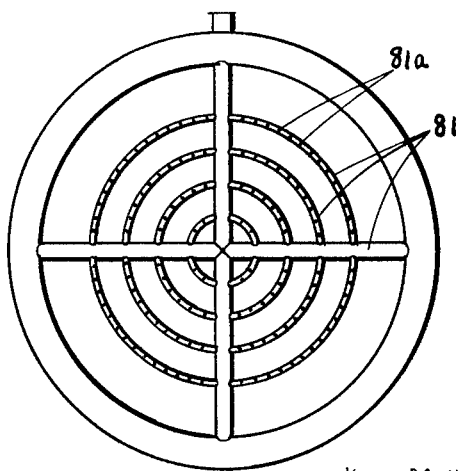
FIGURE 8 is a bottom elevation of the liquid material sprayer used in the embodiment of FIGURE 6.

In FIGURE 6 is shown the discharge apparatus of the present invention in actual operation in conjunction with an adsorber 61 having the outturned flange 61a bolted to the outturned flange 11b of the casing 11, stays 62 being employed to support in position the entire system which is brought into operating position by means of the energizing motor 63 which is associated with the drive shaft 12 via a known reduction means 64 and bevel gears 65. The solid material being supplied from the top of the adsorber 61 passes into the adsorption chamber via plurality of passages 71a of the solid material tray 71 which is transversely secured to the adsorber 61, and the solid material travels downward in direct contact with the liquid material being supplied via small spray openings 81a of the conduit pipe or sprayer 81 which is transversely provided in the adsorber 61, allowing the liquid to pass upward through the solid material on downward shift and to be evacuated out of the system via outlet pipe 66. The solid material further continues downward shift to pass into each of the segmented chamber 24 one after another via upper slit 42 and is stored in said segmented chamber 24 in association with the lower plate 51 until the lower slit 52 comes round into overlapping position with each of the segmented chambers 24 one after another whereby the solid material accumulated in the segmented chambers 24 is allowed to fall into the chute 14 chamber by chamber, the upper and lower slits 42 and 52 being provided in a shifted relationship, namely in an opposite direction in the instant embodiment, and the upper and lower plates 41 and 51 bearing said slits 42 and 52 being energized to rotate independently of the stationary segmented cylindrical member 21 having segmented chambers 24. Thus, the discharge of solid material is carried out in a quantitative manner, forming an intermittent uniform descent and allowing no portion of the solid material being treated to hang in the solid material container. The solid material accumulated in the chute 14 is led into the reservoir 67 via control valve 67a and evacuated out of the system via outlet valve 67b. In the instant embodiment, further, a conical cap 68 is employed in association with the top end portion of the drive shaft 12, and a gasket 69 is inserted inbetween the flanges 61a and 11b, and 11a, 21a and 14a to make the discharge apparatus liquid-tight.

In view of the foregoing, it is evident that the slit plates 41 and 51 and the segmented cylindrical member 21 must be suitably spaced from one another so as not to disturb the rotating movement of the plates 41 and 51 and not to allow the particulate solids descending from the container to intrude into the space between said members 41, 21 and 51.

In order to materialize the uniform descent of solid material, further, the size and shape of the segmented chambers 24 must be determined in view of the distribution and the ways of treatment of the particulate solid material in the container. When the solid material is uniformly distributed throughout the container, it is most desirable to dispose the chambers in a radial manner as adopted in the instant embodiment. When the solid material is disposed around a medium occupying the central portion of the container for heating or other specific purposes, it is desirable to concentrate the segmented chambers in the peripheral portion of the intermediate cylindrical member 21. When the solid material is heated from outside the container, trapezoidal chambers having peripheral portion upwardly slanted and accordingly modified plates may be employed to facilitate the faster descent of those portions of solid material which are heated faster. To extract faster the central portion of the solid material which is heated faster than the other portion, on the other hand, trapezoidal chambers having peripheral portion slanted downward and accordingly modified slit plates may be profitably employed.

In the present embodiment, the size and shape of the slits are in substantial agreement with those of the segmented chambers. There may however be employed oblong-shaped, spherical-shaped or elliptical-shaped slits. Those slits having larger or smaller size and shape than the segmented chambers may also be employed. Not only one but two or more slits may further be provided in each of the plates. The slit plates however must be so disposed that the upper slit be positioned in a shifted relationship to the lower slit so as to create at least a transversal space interval corresponding to the space to be occupied by any of the segmented chambers, namely, at least a transversal spaced interval wide enough not to allow any of the segmented chambers to form inbetween said slit plates a direct passage for a descent of solid material in association with said slits. In other words, a given chamber must not be allowed to form a direct passage with the lower slit before said chamber is completely filled up with the solid material descending from the container.

While this invention has been described with reference to the preferred embodiment illustrated in the drawings, it is evident that numerous changes and modifications can be made without departing from the scope and spirit of the invention, and it is therefore intended that all matters contained in the above description or shown in the accompanying drawings shall be interpreted as illustrative only and not in a limiting sense.

We claim:

1. A solid material discharging device comprising a substantially vertically disposed cylindrical casing of uniform internal dimension adapted to receive a solid material for discharge downwardly, a cylindrical member extending across said casing, wall means dividing said cylindrical member into a plurality of radially extending substantially segment-shaped contiguous chambers each opening at the top and bottom for receiving solid material at the top and for discharging solid material at the bottom, a top plate rotatably mounted in said casing adjacent said top of said cylindrical member, a bottom plate rotatably mounted in said casing adjacent the bottom of said cylindrical member, said top plate having at least one radially extending substantially segment-shaped opening of a size at least equivalent to the size of at least one of said chambers for permitting the passage of material through said top plate and into at least one chamber of said cylindrical member at a time as it is rotated, said bottom plate having at least one radially extending substantially segmental-shaped opening offset from the opening in said top plate and being of a size for permitting the passage of material therethrough from at least one of said chambers of said cylindrical member, means connected to said plates to rotate said plates to effect successive filling of said chambers one after the other around the periphery and thereafter discharge of material in a similar manner from said chambers, a hollow cylindrical absorber having a lower open end located over said top plate and supported above said casing, and a solid material tray extending across said absorber having an opening therethrough for the downfalling of solid material therethrough and onto said top plate.

2. A solid material discharging device comprising a substantially vertically disposed cylindrical casing of uniform internal dimension adapted to receive a solid material for discharge downwardly, a cylindrical member extending across said casing, wall means dividing said cylindrical member into a plurality of radially extending substantially segment-shaped chambers each opening at the top and bottom for receiving solid material at the top and for discharging solid material at the bottom, a top plate rotatably mounted in said casing adjacent said top of said cylindrical member, a bottom plate rotatably mounted in said casing adjacent the bottom of said cylindrical member, said top plate having at least one radially extending substantially segment-shaped opening for permitting the passage of material through said top plate and into at least one chamber of said cylindrical member at a time as it is rotated, said bottom plate having at least one radially extending substantially segmental-shaped opening offset from the opening in said top plate and being of a size for permitting the passage of material therethrough from at least one of said chambers of said cylindrical member, means connected to said plates to rotate said plates to effect successive filling of said chambers and thereafter discharging material from said chambers, said top plates having a peripheral flange extending upwardly, a hollow uniformly dimenisoned cylindrical absorber having its lower end located within the flange of said top plate and supported above said casing, a solid material tray extending across said absorber having a plurality of openings therethrough for the downfalling of solid material therethrough and onto said top plate, and means for direction of a liquid into the solid material as it falls downwardly in said absorber.

References Cited by the Examiner

UNITED STATES PATENTS

| 2,588,960 | 3/1952 | Campbell | 222—452 X |
| 2,877,937 | 3/1959 | Weir | 222—452 |
| 3,102,665 | 9/1963 | Zeiss | 222—452 X |

RAPHAEL M. LUPO, *Primary Examiner.*

LOUIS J. DEMBO, *Examiner.*

S. H. TOLLBERG, *Assistant Examiner.*